United States Patent [19]

Lipshield

[11] 4,225,004
[45] Sep. 30, 1980

[54] TILT-CAB LOCKING DEVICE INCLUDING INTERLOCK MEANS

[75] Inventor: Eugene C. Lipshield, Moberly, Mo.

[73] Assignee: Orscheln Lever Sales Co., Moberly, Mo.

[21] Appl. No.: 1,581

[22] Filed: Jan. 9, 1979

[51] Int. Cl.³ ............................................. B62D 33/06
[52] U.S. Cl. .............................. 180/89.14; 292/144; 296/35.1; 296/190
[58] Field of Search ............... 180/89.12, 89.13, 89.14, 180/89.15; 296/190, 35 R; 292/302, 144

[56] References Cited

U.S. PATENT DOCUMENTS

| | | | |
|---|---|---|---|
| 3,973,793 | 8/1976 | Hirst | 292/144 |
| 4,022,509 | 5/1977 | Bopp | 296/28 C |
| 4,090,731 | 5/1978 | Bopp | 180/89.13 |
| 4,114,718 | 9/1978 | Lipshield | 180/89.14 |

Primary Examiner—John J. Love
Assistant Examiner—John A. Carroll
Attorney, Agent, or Firm—Lawrence E. Laubscher

[57] ABSTRACT

A locking assembly for locking the tilt cab of a vehicle to the vehicle chassis frame is disclosed, including a locking pin slidably connected with a housing for displacement between locked and unlocked positions relative to the locking opening of a blade member that extends within a corresponding cavity contained within the housing when the tilt cab is in its lowered condition, characterized by the provision of an interlocking device that automatically prevents displacement of the locking pin to the locked position when the blade member is not completely seated in the cavity.

4 Claims, 4 Drawing Figures

TILT-CAB LOCKING DEVICE INCLUDING INTERLOCK MEANS

BRIEF DESCRIPTION OF THE PRIOR ART

Tilt-cab locking mechanisms of the type including an axially displaceable locking pin for locking the tilt-cab of a vehicle to the vehicle chassis are well known in the patented prior art, as evidenced by the patents to Hirst et al U.S. Pat. No. 3,973,793, and Bopp et al U.S. Pat. Nos. 4,090,731 and 4,022,509. In the Bopp et al U.S. Pat. No. 4,090,731, consideration was given to increasing the target area afforded to the locking blade by the locking housing cavity, thereby to achieve a simplified more-positive locking operation upon lowering of the tilt cab toward its normal position.

Furthermore, as disclosed by applicant's prior U.S. Pat. No. 4,114,718, in tilt-cab locking mechanisms of the hook and pin type, it has been proposed to provide pawl means for locking a cam member in a hook-releasing position when the pin and hook housings are separated, the pawl being operable to its unlocked condition when the pin and hook housings are returned to their adjacent contiguous position.

Owing to the inherent compact nature of the aforementioned axially-displaceable locking pin type mechanism, it is difficult to provide interlocking means for preventing undesired operation of the locking pin to the locked condition in the event that the components are jammed or improperly seated. Thus, on the one hand, to improve the seating of the blade within the housing chamber, it has been proposed to increase the target area by angling out the upper divergent portion of at least one cavity wall with a greater angle of divergency, thus resulting in the disadvantage that the available space for providing interlocking means is greatly reduced. This is particularly the case wherein the locking pin retracted means comprises a fluid-motor of the piston and cylinder type arranged at least partially within the compression spring that normally biases the locking pin toward the locked condition.

SUMMARY OF THE INVENTION

Accordingly, a primary object of the present invention is to provide an improved tilt-cab locking mechanism of the axially displaceable locking pin type including interlock means for automatically preventing displacement of the locking pin to the locked position when the blade member on the tilt cab is not completely seated within the corresponding cavity contained in the housing member on the vehicle chassis.

In accordance with a more specific object, the interlock means includes a U-shaped interlock member that is pivotally connected at one end in a recess contained in the cavity wall that faces the cavity wall in which the axially displaceable locking pin is mounted. The interlock member is normally spring-biased toward an extended position extending across the housing cavity, one leg of the interlock member extending into the path of axial travel of the locking pin. The interlocking member is pivoted to the retracted position by the blade member only when the blade member is completely seated within the housing chamber.

In accordance with a further object of the invention, the horizontal pivot axis of the interlock member is arranged at a lower elevation than the path of travel of the locking pin, abutment means being provided on the housing for engagement with the other arm of the interlock member to prevent pivoting thereof upwardly beyond its extended position.

BRIEF DESCRIPTION OF THE DRAWING

Other objects and advantages of the invention will become apparent when viewed in the light of the accompanying drawings; in which.

DETAILED DESCRIPTION

Figure 1:
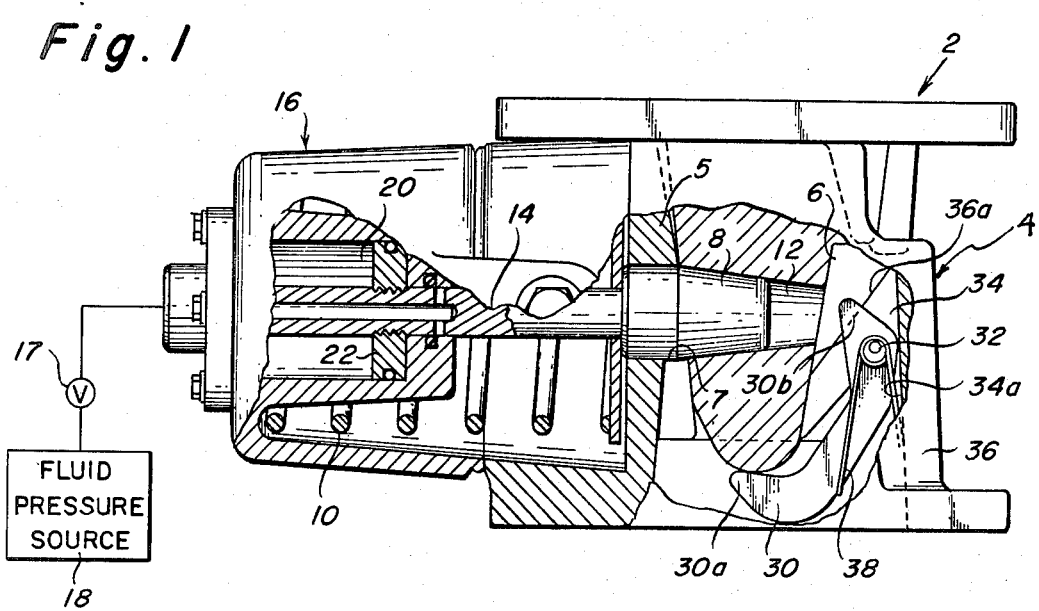
FIGS. 1 and 2 are partially sectioned side elevational views of the tilt-cab locking means in the locked and fully-unlocked positions, respectively.
Figure 2:
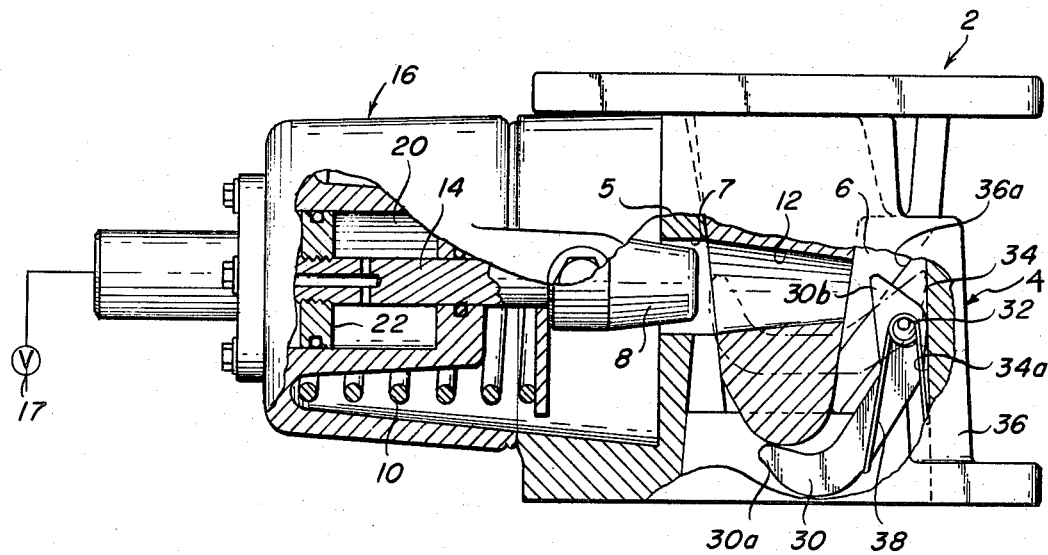

Referring first more particularly to FIGS. 1 and 2, the tilt-cab locking mechanism of the present invention includes a downwardly depending blade member 2 that is adapted to be bolted to the bottom surface of the tilt cab, and a housing 4 that is adapted to be bolted to the vehicle chassis, as is known in the art. The housing 4 contains a cavity 6 of generally rectangular horizontal cross-section, which cavity has opposed pairs of side walls that converge downwardly. Similarly, the blade member 2 is of generally rectangular cross-section, which blade member has converging external wall surfaces which are contiguous with and seated upon the corresponding cavity side walls when the blade member is completely inserted within the cavity as shown in FIGS. 1 and 2.

Slidably mounted in an opening 7 contained in one side wall of the housing cavity is a locking pin 8 that is normally biased by compression spring 10 within a locking bore 12 contained in the blade member 2. Preferably, the locking pin 8 and locking bore 12 have corresponding tapered configurations, thereby to produce the wedging effect illustrated in FIG. 1. The locking pin 8, which is connected with piston rod 14, is axially displaced between the locked position of FIG. 1 and the released position of FIG. 2 by piston and cylinder motor means 16 that are at least partially mounted concentrically within the compression spring 10. Thus, as in the prior Bopp et al U.S. Pat. Nos. 4,022,509 and 4,090,731, when pressure fluid from the source 18 is introduced into working chamber 20 of piston and cylinder motor means, piston 22, piston rod 14, and locking pin 8 are displaced to the left against the biasing force of compression spring 10.

Figure 3:
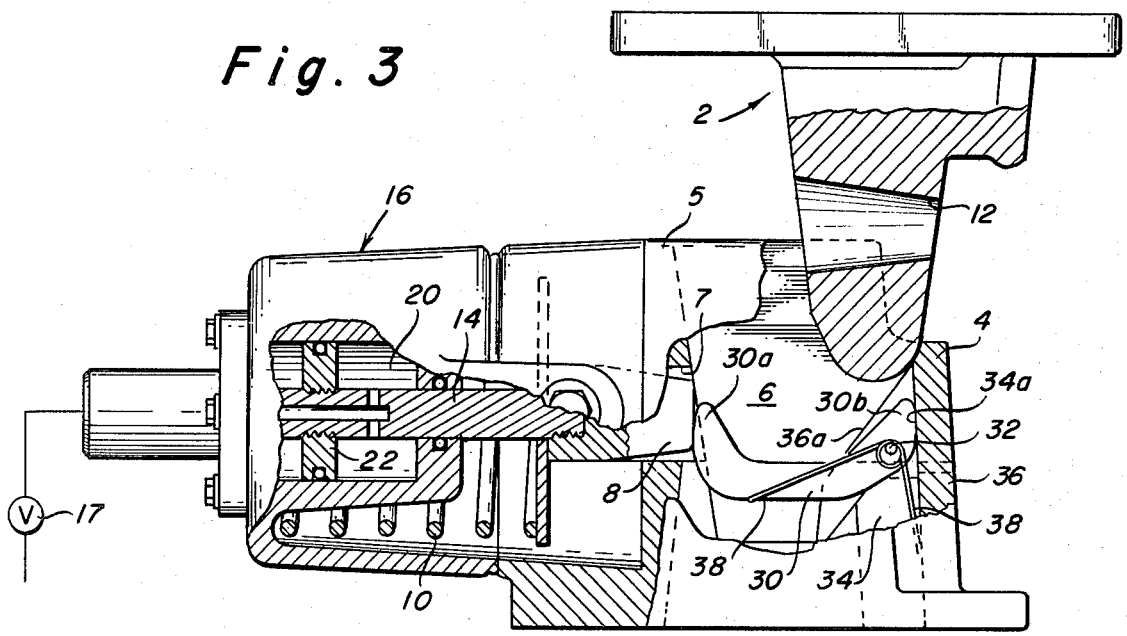
FIGS. 3 and 4 are partially sectioned side elevation and end views, respectively, of the tilt-cab locking mechanism in a jammed or misaligned condition.

In accordance with the present invention, an interlock member 30 of generally U-shaped configuration is provided that is pivotally connected at one end by pivot 32 within a recess 34 contained in the second cavity wall 36 that faces the first cavity wall 5 which contains the opening 7. Spring member 38 pivotally biases the interlock member 30 from the downwardly depending retracted position of FIGS. 1 and 2 toward the horizontally arranged extended position of FIGS. 3 and 4. When the interlock member 30 is in the horizontal extended position of FIGS. 3 and 4, the upwardly extending leg portion 30a is directly in the line of travel of the retracted locking pin 8, and the other leg portion 30b is in abutting engagement with the abutment surface 34a defined within the recess contained in the second cavity wall, thereby limiting the upward extent of pivotal travel of the interlock member 30. As shown in FIG. 3, the pivot axis 32 of the interlock member 30 is arranged at a lower elevation than the axis of linear travel of the locking pin 8, thereby to afford maximum support for the interlock member 30 when in the extended position of FIG. 3.

OPERATION

Figure 4:
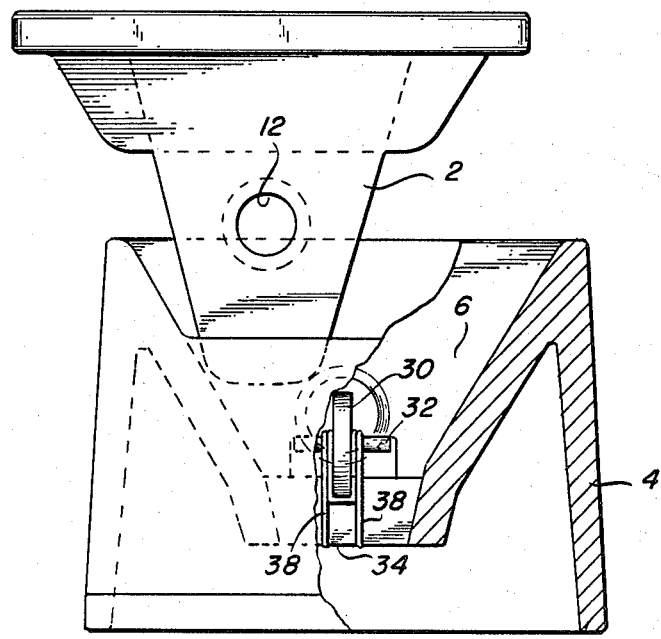

In operation, assuming that the tilt-cab locking mechanism is in the locked position of FIG. 1, upon opening of valve 17, pressure fluid is introduced into the working chamber 20 of the piston and cylinder motor means 16, whereupon piston 22, piston rod 14 and locking pin 8 are displaced to the left toward the released position of FIG. 2. Since the blade member 2 is now unlocked from the housing 4, the tilt cab may be pivoted upwardly to the open position relative to the vehicle chassis. As the blade member 2 is withdrawn from the locking cavity 6, interlock member 30 is pivoted upwardly by spring 38 about pivot shaft 32 toward the extended position of FIG. 3, whereupon interlock member leg portion 30a is positioned in the line of travel of the locking pin 8. The other leg portion 30b of interlock member 30 is in abutting relation with the abutment surface 34a of recess 34, thereby preventing further upward pivotal movement of the interlock member 30 beyond its illustrated extended position. Upon operation of control valve 17, to depressurize chamber 20 compression spring 10 causes locking pin 8 to be shifted to the right in abutting relation with the upwardly extending arm portion 30a of interlock member 30. Consequently, the locking pin 8 is restrained against further movement to the right. Thus, in the event that the blade member should be in a misaligned or jammed condition as shown in FIGS. 3 and 4, the locking pin 8 will be prevented from further displacement to the right within the locking cavity 6. In the event that the misalignment or jammed condition has been corrected, the lower extremity of the blade member 2 will be directed by the outwardly divergent target portion 36a at the upper end of the second side wall 36, whereupon the lower extremity of the blade member 2 will engage the interlocking member 30 to pivot the same downwardly against the force of spring 38 toward the retracted position of FIGS. 1 and 2. Owing to the location of the interlock pivot axis 32 at a lower elevation than the line of travel of the locking pin 8, the target area 36a of the outwardly divergent upper portion of the second side wall 36 has a substantial area, thereby to increase the guiding effect afforded by this target area as the tilt cab is lowered relative to the chassis frame. Furthermore, the interlock member will not interfere with this guiding effect, and will maintain the locking pin 8 in the FIG. 3 condition until the lower extremity of the blade member 2 has progressed a substantial amount within the locking cavity 6.

While in accordance with the Patent Statutes, the preferred form and embodiment of the invention has been illustrated and described, it will be apparent to those skilled in the art that various changes and modifications may be made without deviating from the inventive concepts set forth above.

I claim:

1. A locking assembly for locking the tilt cab of a vehicle to the vehicle chassis frame, comprising
   (a) a housing adapted for connection with the chassis frame, the upper portion of said housing containing a cavity of generally rectangular cross-section configuration including downwardly converging opposed pairs of side walls;
   (b) a blade member for connection with the tilt cab, said blade member being arranged to extend in seated relation within said housing cavity when the tilt cab is in the lowered position relative to the chassis frame, said blade member having a rectangular cross-sectional configuration and including tapered opposed pairs of outer surfaces which correspond generally with the cavity wall surfaces, said blade member containing a generally horizontally-extending locking opening;
   (c) a horizontal locking pin mounted for axial displacement within an opening contained in a first cavity wall of said housing for axial displacement between locked and unlocked positions relative to said blade member locking opening;
   (d) first spring means normally biasing said locking pin toward its locked position;
   (e) means for retracting said locking pin against the biasing force of said spring means toward its unlocked position; and
   (f) interlock means connected with a second cavity wall opposite said first cavity wall for preventing displacement of said locking pin toward the locked position when said blade member is incompletely seated within said housing cavity, said second cavity wall including a lower portion in parallel contiguous seated engagement with the corresponding outer blade surface when the blade member is completely inserted within said housing cavity, the upper portion of said second cavity wall being inclined outwardly from the lower wall portion to define an increased target area for facilitating entry of said blade member into said housing cavity as the tilt cab is lowered toward the chassis frame, said interlock means comprising
      (1) an interlock member pivotally connected at one end within a recess contained within the lower portion of said second cavity wall for pivotal movement about a horizontal pivot axis between downwardly extending retracted and horizontally extending extended positions relative to said second cavity wall, respectively; and
      (2) second spring means biasing said interlock member toward said extended position, said interlock member, when in the extended position, extending across said cavity opposite said locking pin for preventing the axial displacement thereof toward said locked position, said interlock member being pivoted by said blade member toward the retracted position only when said blade member is completely seated within the housing cavity.

2. Apparatus as defined in claim 1, wherein said interlock member has a generally U-shaped configuration including a pair of generally upwardly extending arms; and further wherein the elevation of the pivot axis of said interlock member is lower than the longitudinal axis of said locking pin, the arm of said interlock member adjacent said locking pin extending opposite the path of travel of said locking pin when said interlock member is in the extended position.

3. Apparatus as defined in claim 2, and further including abutment means arranged on said housing for cooperation with the other arm of said interlock member for preventing pivotal movement thereof beyond said extended position.

4. Apparatus as defined in claim 3, wherein said first spring means comprises a compression spring; and further wherein the locking pin retracting means comprises a piston-cylinder fluid motor arranged at least partially concentrically within said compression spring.

* * * * *